United States Patent
Lee et al.

(10) Patent No.: US 9,236,972 B2
(45) Date of Patent: Jan. 12, 2016

(54) OPTICAL IMPAIRMENT AWARE PATH COMPUTATION ARCHITECTURE IN PCE BASED NETWORK

(75) Inventors: Young Lee, Plano, TX (US); Linda Dunbar, Plano, TX (US)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 13/350,173

(22) Filed: Jan. 13, 2012

(65) Prior Publication Data

US 2012/0114329 A1 May 10, 2012

Related U.S. Application Data

(63) Continuation of application No. 12/046,557, filed on Mar. 12, 2008.

(60) Provisional application No. 60/895,283, filed on Mar. 16, 2007.

(51) Int. Cl.
*H04L 12/28* (2006.01)
*H04J 14/00* (2006.01)
(Continued)

(52) U.S. Cl.
CPC ......... *H04J 14/0246* (2013.01); *H04J 14/0257* (2013.01); *H04J 14/0267* (2013.01); *H04J 14/0271* (2013.01); *H04L 45/00* (2013.01); *H04L 45/22* (2013.01); *H04L 45/28* (2013.01); *H04L 45/42* (2013.01); *H04L 45/50* (2013.01); *H04L 45/62* (2013.01); *H04Q 11/0062* (2013.01); *H04J 14/0221* (2013.01);

(Continued)

(58) Field of Classification Search
None
See application file for complete search history.

(56) References Cited

U.S. PATENT DOCUMENTS 7,110,363 B1 * 9/2006 Lawrence ........... H04L 12/5601
370/236.1
7,218,852 B1 * 5/2007 Sharma ............... H04J 14/0227
398/25

(Continued)

FOREIGN PATENT DOCUMENTS

CN 1525768 9/2004
CN 1567747 1/2005

(Continued)

OTHER PUBLICATIONS

"Series G: Transmission Systems and Media, Digital Systems and Networks, Transmission Media and Optical Systems Characteristics—Optical Fibre Cables, Definitions and Test Methods for Linear, Deterministic Attributes of Single-Mode Fibre and Cable," ITUT 650.1, Jul. 2010, 76 pages.

(Continued)

*Primary Examiner* — Marsha D Banks Harold
*Assistant Examiner* — Christopher Wyllie
(74) *Attorney, Agent, or Firm* — Conley Rose, P.C.; Grant Rodolph; Brandt D. Howell (57) ABSTRACT

An apparatus comprising at least one processor configured to implement a method comprising receiving a path computation request comprising at least one path computation constraint, and determining whether there is a path through an optical network that satisfies the path computation constraints. Also disclosed is an apparatus configured to process a data structure comprising a flags field comprising at least one flag having one of an active state or an inactive state, wherein each flag is representative of an optical quality constraint.

16 Claims, 8 Drawing Sheets

(51) Int. Cl.
| | |
|---|---|
| *H04J 14/02* | (2006.01) |
| *H04L 12/701* | (2013.01) |
| *H04L 12/707* | (2013.01) |
| *H04L 12/703* | (2013.01) |
| *H04L 12/717* | (2013.01) |
| *H04L 12/723* | (2013.01) |
| *H04L 12/721* | (2013.01) |
| *H04Q 11/00* | (2006.01) |

(52) U.S. Cl.
CPC .......... *H04J14/0258* (2013.01); *H04J 14/0269* (2013.01); *H04J 14/0284* (2013.01); *H04Q 2011/0064* (2013.01); *H04Q 2011/0073* (2013.01); *H04Q 2011/0088* (2013.01)

(56) References Cited

U.S. PATENT DOCUMENTS

| | | | | |
|---|---|---|---|---|
| 7,668,135 | B2* | 2/2010 | Verma | H04L 45/00 370/232 |
| 7,769,885 | B1* | 8/2010 | Kompella | H04L 45/00 370/219 |
| 8,290,366 | B2* | 10/2012 | Lee | H04L 45/00 398/57 |
| 8,346,079 | B2* | 1/2013 | Lee | H04J 14/0227 398/45 |
| 8,396,364 | B2* | 3/2013 | Lee | H04J 14/0256 370/235 |
| 8,666,246 | B2* | 3/2014 | Lee | H04Q 11/0062 370/351 |
| 8,718,469 | B2* | 5/2014 | Lee | H04J 14/0256 370/235 |
| 8,891,382 | B2* | 11/2014 | Lee | H04L 45/62 370/248 |
| 8,923,695 | B2* | 12/2014 | Lee | H04J 14/0227 398/45 |
| 2002/0057691 | A1* | 5/2002 | Enoki | H04L 45/50 370/392 |
| 2002/0093711 | A1* | 7/2002 | Simmons | H04J 14/0228 398/79 |
| 2002/0126343 | A1* | 9/2002 | Fumagalli et al. | 359/118 |
| 2003/0035166 | A1 | 2/2003 | Zhang et al. | |
| 2003/0043745 | A1 | 3/2003 | Kano et al. | |
| 2003/0099014 | A1* | 5/2003 | Egner et al. | 359/124 |
| 2003/0103449 | A1* | 6/2003 | Barsheshet | H04L 12/42 370/222 |
| 2003/0145105 | A1* | 7/2003 | Desineni | H04L 12/2697 709/238 |
| 2003/0219198 | A1* | 11/2003 | Zhou | 385/24 |
| 2004/0018016 | A1 | 1/2004 | O'Mahoney et al. | |
| 2004/0022223 | A1* | 2/2004 | Billhartz | H04L 45/00 370/338 |
| 2004/0037558 | A1 | 2/2004 | Beshai | |
| 2004/0042404 | A1* | 3/2004 | Ravindran | H04L 45/26 370/238 |
| 2004/0156316 | A1* | 8/2004 | Mukherjee | H04J 14/0227 370/235 |
| 2004/0171398 | A1 | 9/2004 | Hanaoka et al. | |
| 2004/0208559 | A1* | 10/2004 | Krishnaswamy et al. | 398/59 |
| 2005/0078659 | A1* | 4/2005 | Ashwood Smith | A61N 7/02 370/352 |
| 2005/0180431 | A1 | 8/2005 | Kinoshita et al. | |
| 2005/0220054 | A1* | 10/2005 | Meier | G06Q 20/3674 370/331 |
| 2005/0259571 | A1 | 11/2005 | Battou | |
| 2006/0077909 | A1* | 4/2006 | Saleh | H04L 12/66 370/254 |
| 2006/0117110 | A1* | 6/2006 | Vasseur | H04L 45/00 709/232 |
| 2006/0176820 | A1* | 8/2006 | Vasseur | H04L 45/02 370/241 |
| 2006/0203744 | A1* | 9/2006 | Patel | H04L 45/02 370/254 |
| 2006/0291447 | A1 | 12/2006 | Siliquini et al. | |
| 2007/0019904 | A1* | 1/2007 | Bulow | H04B 10/2569 385/16 |
| 2007/0133406 | A1* | 6/2007 | Vasseur | H04L 45/02 370/230 |
| 2007/0217419 | A1* | 9/2007 | Vasseur | 370/392 |
| 2008/0205271 | A1* | 8/2008 | Aissaoui | H04L 12/66 370/235 |
| 2008/0225711 | A1* | 9/2008 | Raszuk | H04L 45/00 370/230.1 |
| 2008/0225723 | A1* | 9/2008 | Lee | H04J 14/0271 370/235 |
| 2009/0034972 | A1* | 2/2009 | Fiaschi | H04J 14/0227 398/58 |
| 2009/0304380 | A1* | 12/2009 | Sadananda | H04Q 11/0062 398/26 |
| 2010/0014859 | A1* | 1/2010 | D'Alessandro et al. | 398/48 |
| 2012/0114329 | A1* | 5/2012 | Lee | H04J 14/0271 398/26 |
| 2012/0321308 | A1* | 12/2012 | Lee | H04L 45/00 398/49 |
| 2015/0037026 | A1* | 2/2015 | Lee | H04L 45/62 398/17 |

FOREIGN PATENT DOCUMENTS

| | | |
|---|---|---|
| CN | 1710868 | 12/2005 |
| JP | 2005341137 | 12/2005 |

OTHER PUBLICATIONS

"Series G: Transmission Systems and Media, Digital Systems and Networks, Transmission Media and Optical Systems Characteristics—Optical Fibre Cables, Definitions and Test Methods for Statistical and Non-Linear Attributes of Single-Mode Fibre and Cable," ITUT 650.2, Jul. 2007, 80 pages.

"Series G: Transmission Systems and Media, Digital Systems and Networks, Transmission Media and Optical Systems Characteristics—Optical Fibre Cables, Test Methods for Installed Single-Mode Optical Fibre Cable Links," ITUT 650.3, Mar. 2008, 22 pages.

"Series G: Transmission Systems and Media, Digital Systems and Networks, Transmission Media and Optical Systems Characteristics—Optical Fibre Cables, Characteristics of a Single-Mode Optical Fibre and Cable," ITUT 652, Nov. 2009, 22 pages.

"Series G: Transmission System and Media, Digital Systems and Networks, Transmission Media and Optical Systems Characteristics—Optical Fibre Cables, Characteristics of a Dispersion-Shifted, Single-Mode Optical Fibre and Cable," ITUT G.653, Jul. 2010, 22 pages.

"Series G: Transmission Systems and Media, Digital Systems and Networks, Transmission Media and Optical Systems Characteristics—Optical Fibre Cables, Characteristics of a Cut-Off Shifted, Single-Mode Optical Fibre and Cable," ITUT G. 654, Jul. 2010, 22 pages.

"Series G: Transmission Systems and Media Digital and Networks, Transmission Media and Optical Systems Characteristics—Optical Fibre Cables, Characteristics of a Non-Zero Dispersion-Shifted Single-Mode Optical Fibre and Cable," ITUT G.655, Nov. 2009, 26 pages.

"Series G: Transmission Systems and Media Digital and Networks, Transmission Media and Optical Systems Characteristics—Optical Fibre Cables, Characteristics of a Fibre and Cable with Non-Zero Dispersion for Wideband Optical Transport," ITUT G.656, Jul. 2010, 20 pages.

"Series G: Transmission Systems and Media Digital and Networks, Transmission Media and Optical Systems Characteristics—Characteristics of Optical Components and Subsystems, Definitions and Test Methods for the Relevant Generic Parameters of Optical Amplifier Devices and Subsystems," ITUT G.661, Jul. 2007, 32 pages.

"Series G: Transmission Systems and Media Digital and Networks, Transmission Media and Optical Systems Characteristics—Characteristics of Optical Components and Subsystems, Generic Characteristics of Optical Anplifier Devices and Subsystems," ITUT G.662, Jul. 2005, 16 pages.

(56) References Cited

OTHER PUBLICATIONS

"Series G: Transmission Systems and Media Digital and Networks, Transmission Media and Optical Systems Characteristics—Characteristics of Optical Components and Subsystems, Transmission Characteristics of Optical Components and Subsystems," ITUT G.671, Jan. 2009, 44 pages.

"Series G: Transmission Systems and Media Digital and Networks, Transmission Media and Optical Systems Characteristics—Characteristics of Optical Systems, Physical Transfer Functions of Optical Network Elements," ITUT G.680, Jul. 2007, 68 pages.

"Series G: Transmission Systems and Media Digital and Networks, Transmission Media and Optical Systems Characteristics—Characteristics of Optical Components and Subsystems, Optical Interfaces for Single Channel STM-64 and Other SDH Systems with Optical Amplifiers," ITUT G.691, Mar. 2006, 50 pages.

"Series G: Transmission Systems and Media Digital and Networks, Transmission Media and Optical Systems Characteristics—Characteristics of Optical Components and Sub-systems, Optical Interfaces for Multichannel Systems with Optical Amplifiers," ITUT G.692, Oct. 1998, 41 pages.

"Series G: Transmission Systems and Media Digital and Networks, Transmission Media and Optical Systems Characteristics—Characteristics of Optical Components and Subsystems, Spectral Grids for WDM Applications: DWDM Frequency Grid," ITUT G.694.1, Jun. 2002, 14 pages.

"Series G: Transmission Systems and Media Digital and Networks, Transmission Media and Optical Systems Characteristics—Characteristics of Optical Components and Subsystems, Spectral Grids for WDM Applications: CWDM Wavelength Grid," ITUT G.694.2, Dec. 2003, 12 pages.

"Series G: Transmission Systems and Media Digital and Networks, Transmission Media and Optical Systems Characteristics—Characteristics of Optical Systems, Multichannel DWDM Applications with Single-Channel Optical Interfaces," ITUT G.698.1, Nov. 2009, 34 pages.

"Series G: Transmission Systems and Media Digital and Networks, Transmission Media and Optical Systems Characteristics—Characteristics of Optical Systems, Amplified Multichannel Dense Wavelength Division Multiplexing Applications with Single Channel Optical Interfaces," G.698.2, Nov. 2009, 38 pages.

"Series G: Transmission Systems and Media Digital and Networks, Digital Networks-Optical Transport Networks, Architecture of Optical Transport Networks," ITUT G.872, Nov. 2001, 72 pages.

"Series G: Transmission Systems and Media Digital and Networks, Digital Sections and Digital Line Systems, Optical Interfaces for Equipments and Systems Relating to the Synchronous Digital Hierarchy," ITUT G.957, Mar. 2006, 38 pages.

"Series G: Transmission Systems and Media Digital and Networks, Digital Sections and Digital Line System—Digital Line Systems, Optical Transport Network Physical Layer Interfaces," ITUT G.959.1, Nov. 2009, 74 pages.

Series G: Transmission Systems and Media Digital and Networks, Optical Systems Design and Engineering Considerations, ITUT Supplement 39, Dec. 2008, 106 pages.

Bernstein, G., Ed., et al., "Framework for GMPLS and PCE Control of Wavelength Switched Optical Networks," draft-bernstein-ccamp-wavelength-switched-03.txt, Feb. 19, 2008, 68 pages.

Ash, J., et al.; "Path Computation Element (PCE) Communication Protocol Generic Requirements"; RFC 4657; Network Working Group; Sep. 2006; 21 pages.

Augustyn, W., et al.; "Service Requirements for Layer 2 Provider-Provisioned Virtual Private Networks"; RFC 4665; Network Working Group; Sep. 2006; 32 pages.

Bradner, S., "Key Words for Use in RFCs to Indicate Requirement Levels," RFC 2119, Mar. 1997, 3 pages.

Farrel, A., et. al., "A Path Computation Element (PCE)-Based Architecture," RFC 4655, Aug. 2006, 40 pages.

Mannie, E., Ed., "Generalized Multi-Protocol Label Switching (GMPLS) Architecture," RFC 3945, Oct. 2004, 69 pages.

Strand, J., et al.; "Impairments and Other Constraints in Optical Layer Routing"; Network Working Group; RFC 4054; May 2005, 24 Pages.

Lee, Y., et al., "Framework for GMPLS and PCE Control of Wavelength Switched Optical Networks," RFC 6163, Apr. 2011, 52 pages.

Foreign Communication From a Related Counterpart Application, PCT Application PCT/CN2008/070504, International Search Report dated Jun. 19, 2008, 2 pages.

Foreign Communication From a Related Counterpart Application, PCT Application PCT/CN2008/070504, Written Opinion dated Jun. 19, 2008, 4 pages.

Agrawal, G., "Fiber-Optic Communication Systems Third Edition," Chapter 2, John Wiley & Sons, Inc. 2002, pp. 23-76.

Agrawal, G., "NonLinear Fiber Optics Fourth Edition," Chapter 2, Elsevier Inc., 2007, pp. 25-50.

Eppstein, D., "Finding the k Shortest Paths," 35th IEEE Symposium Foundation of Computer Science, Mar. 31, 1997, 26 pages.

Eppstein, D., "Finding the k Shortest Paths," 35th IEEE Symposium Foundation of Computer Science, May 31, 1994, 23 pages.

Strand, John, et al.; "Issues for Routing in the Optical Layer"; AT&T Laboratories; IEEE Communication Magazine, vol. 2; No. 39; pp. 81-87; Feb. 2001.

Office Action dated Oct. 2, 2013, 30 pages, U.S. Appl. No. 12/046,557, filed Mar. 12, 2008.

Office Action dated Jul. 8, 2010, U.S. Appl. No. 12/046,557, filed Mar. 12, 2008, 6 pages.

Office Action dated Aug. 4, 2010, U.S. Appl. No. 12/046,557, filed Mar. 12, 2008, 9 pages.

Office Action dated Dec. 6, 2010, U.S. Appl. No. 12/046,557, filed Mar. 12, 2008, 10 pages.

Office Action dated Apr. 13, 2011, U.S. Appl. No. 12/046,557, filed Mar. 12, 2008, 15 pages.

Office Action dated Oct. 6, 2011 U.S. Appl. No. 12/046,557, filed Mar. 12, 2008, 19 pages.

Office Action dated May 21, 2014, 34 pages, U.S. Appl. No. 12/046,557, filed Mar. 12, 2008.

Fang, L., Ed., "Security Framework for MPLS and GMPLS Networks," Network Working Group, Internet Draft, draft-ietf-mpls-mpls-and-gmpls-security-framework-02.txt, Feb. 2008, 58 pages.

Oki, E., et al., "Framework for PCE-Based Inter-Layer MPLS and GMPLS Traffic Engineering," Network Working Group, Internet Draft, draft-ietf-pce-inter-layer-frwk-02.txt, Oct. 2006, 17 pages.

Oki, E., et al., "Framework for PCE-Based Inter-Layer MPLS and GMPLS Traffic Engineering," Network Working Group, Internet Draft, draft-ietf-pce-inter-layer-frwk-03.txt, Mar. 2007, 16 pages.

Oki, E., et al., "Framework for PCE-Based Inter-Layer MPLS and GMPLS Traffic Engineering," Network Working Group, Internet Draft, draft-ietf-pce-inter-layer-frwk-06.txt, Jan. 2008, 31 pages.

\* cited by examiner

OPTICAL IMPAIRMENT AWARE PATH COMPUTATION ARCHITECTURE IN PCE BASED NETWORK

CROSS-REFERENCE TO RELATED APPLICATIONS

The present application is a continuation of U.S. patent application Ser. No. 12/046,557, filed by Lee, et al. and entitled "Optical Impairment Aware Path Computation Architecture in PCE Based Network," which claims priority to U.S. Provisional Patent Application No. 60/895,283 filed Mar. 16, 2007 by Dunbar et al. and entitled "System for Optical Impairment Aware Path Computation Architecture in PCE Based Network", both of which are incorporated herein by reference as if reproduced their entireties.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Wavelength division multiplexing (WDM) is one technology that is envisioned to increase bandwidth capability and enable bidirectional communications in optical networks. In WDM networks, multiple data signals can be transmitted simultaneously between network elements (NEs) using a single fiber. Specifically, the individual signals may be assigned different transmission wavelengths so that they do not interfere or collide with each other. The path that the signal takes through the network is referred to as the lightpath. One type of WDM network, a wavelength switched optical network (WSON), seeks to switch the optical signals with fewer optical-electrical-optical (OEO) conversions along the lightpath, e.g. at the individual NEs, than existing optical networks.

One of the challenges in implementing WDM networks is the determination of the path for the various signals that are being transported through the network at any given time. Unlike traditional circuit-switched and connection-oriented packet-switched networks that merely have to determine a route for the data stream across the network, WDM networks are burdened with the additional constraint of having to ensure that the same wavelength is not simultaneously used by two signals over a single fiber. This constraint is compounded by the fact that WDM networks typically use specific optical bands comprising a finite number of usable optical wavelengths. Path computations can also be constrained due to other issues, such as excessive optical noise, along the lightpath.

SUMMARY

In one embodiment, the disclosure includes an apparatus comprising at least one processor configured to implement a method comprising receiving a path computation request comprising at least one path computation constraint, and determining whether there is a path through an optical network that satisfies the path computation constraints.

In another embodiment, the disclosure includes an apparatus configured to process a data structure comprising a flags field comprising at least one flag having one of an active state or an inactive state, wherein each flag is representative of an optical quality constraint.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein is a method and system for including one or more path computation constraints in the PCE protocol (PCEP). Specifically, various types of path computation constraints are disclosed, as well as a communication protocol by which the PCE can consider the path computation constraints when performing its path computation for the PCC. Various alternatives are proposed whereby a plurality of PCEs each having authority over a different network communicate with each other and provide a unified path computation to the PCC. Alternatively, one or more PCEs may analyze a network at different layers, such as the service layer and the transport layer, to ensure that the path computation complies with the path computation constraints at each layer.

Figure 1:
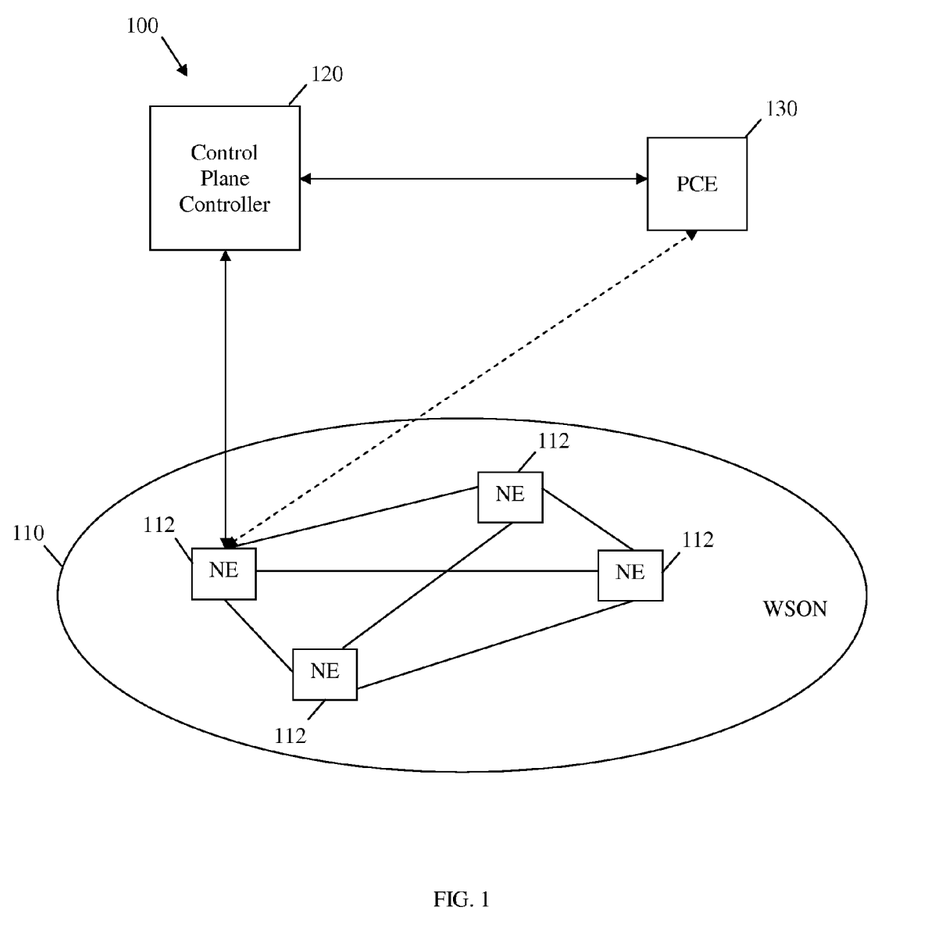
FIG. 1 is a schematic diagram of an embodiment of a WSON system.

FIG. 1 illustrates one embodiment of a WSON system 100. The system 100 may comprise a WSON 110, a control plane controller 120, and a PCE 130. The WSON 110, control plane controller 120, and PCE 130 may communicate with each other via optical, electrical, or wireless means. The WSON 110 may comprise a plurality of NEs 112 coupled to one another using optical fibers. In an embodiment, the optical fibers may also be considered NEs 112. The optical signals may be transported through the WSON 110 over lightpaths that may pass through some of the NEs 112. In addition, some of the NEs 112, for example those at the ends of the WSON 110, may be configured to convert between electrical signals from external sources and the optical signals used in the WSON 110. Although four NEs 112 are shown in the WSON 110, the WSON 110 may comprise any number of NEs 112.

The WSON 110 may be any optical network that uses active or passive components to transport optical signals. The WSON 110 may implement WDM to transport the optical signals through the WSON 110, and may comprise various types of optical components. For example, the WSON 110 may comprise optical cross connects (OXC), photonic cross connects (PXC), reconfigurable optical add/drop multiplexers (ROADM), wavelength selective switches (WSS), fixed optical add/drop multiplexers (FOADM), and so forth. The WSON 110 may be part of a long haul network, a metropolitan network, or an access network.

The control plane controller 120 may coordinate activities within the WSON 110. Specifically, the control plane controller 120 may receive optical connection requests and provide lightpath signaling to the WSON 110 via Multiprotocol Label Switching Traffic Engineering (MPLS-TE) or Generalized Multi-Protocol Label Switching (GMPLS), thereby coordinating the NEs 112 such that data signals are routed through the WSON 110 with little or no contention. In addition, the control plane controller 120 may communicate with the PCE 130 using PCEP to provide the PCE 130 with information that may be used for the path computation, and/or receive the path computation from the PCE 130 and forward the path computation to the NEs 112. The control plane controller 120 may be located in a component outside of the WSON 110, such as an external server, or may be located in a component within the WSON 110, such as a NE 112.

The PCE 130 may perform all or part of the path computation for the WSON system 100. Specifically, the PCE 130 may determine the routes of Label Switched Paths (LSPs) through the network. As such, the PCE 130 may receive the path computation constraints that may be used for the path computation from the control plane controller 120, from the NEs 112, or both. The PCE 130 may use the path computation constraints when computing the routes, e.g. lightpaths, for the optical signals. The path computation may include at least one route for each incoming signal and optionally at least one wavelength associated with each route. The PCE 130 may then send the path computation to the control plane controller 120 or directly to the NEs 112. To assist the PCE 130 in this process, the PCE 130 may comprise a global traffic-engineering database (TED), a path computation information database, an optical performance monitor (OPM), a physical layer constraint (PLC) information database, or combinations thereof. The PCE 130 may be located in a component outside of the WSON 110, such as an external server, or may be located in a component within the WSON 110, such as a NE 112.

The NEs 112 may be coupled to each other via optical fibers. The optical fibers may be used to establish optical links and transport the optical signals between the NEs 112. The optical fibers may comprise standard single mode fibers (SMFs) as defined in ITU-T standard G.652, dispersion shifted SMFs as defined in ITU-T standard G.653, cut-off shifted SMFs as defined in ITU-T standard G.654, non-zero dispersion shifted SMFs as defined in ITU-T standard G.655, wideband non-zero dispersion shifted SMFs as defined in ITU-T standard G.656, or combinations thereof. These fiber types may be differentiated by their optical impairment characteristics, such as attenuation, chromatic dispersion, polarization mode dispersion (PMD), four wave mixing, or combinations thereof. These effects may be dependent upon wavelength, channel spacing, input power level, or combinations thereof. The optical fibers may be used to transport WDM signals, such as course WDM (CWDM) signals as defined in ITU-T G.694.2 or dense WDM (DWDM) signals as defined in ITU-T G.694.1. All of the standards described herein are incorporated herein by reference.

In some embodiments, the PCE 130 may receive a path computation request from a PCC. The PCC may be any client application requesting a path computation to be performed by the PCE 130. The PCC may also be any network component that makes such a request, such as the control plane controller 120, or any NE 112, such as a ROADM or a FOADM. Generally, the PCC communicates with the PCE 130 using PCEP, although other acceptable communications protocol may be used as well.

There may be many types of path computation constraints that can affect the path computation. In one embodiment, the path computation constraints include optical quality constraints. Examples of such include the optical signal-to-noise ratio (OSNR), amplifier spontaneous emission (ASE), PMD, polarization-dependent loss (PDL), coherent optical crosstalk, incoherent optical crosstalk, effective pass-band, gain non-uniformity, gain transients, and chromatic dispersion. In some embodiments, the path computation constraints may be classified as linear in that their effects are independent of the optical signal power and they affect the wavelengths individually. Alternatively, the path computation constraints may be classified as nonlinear in that their effects are dependent of the optical signal power, generate dispersion on a plurality of wavelength channels, and induce crosstalk between wavelength channels. Regardless, the path computation constraints are communicated to the PCE 130 so that the PCE 130 may consider them when computing a signal's path through the WSON 100.

Figure 2:
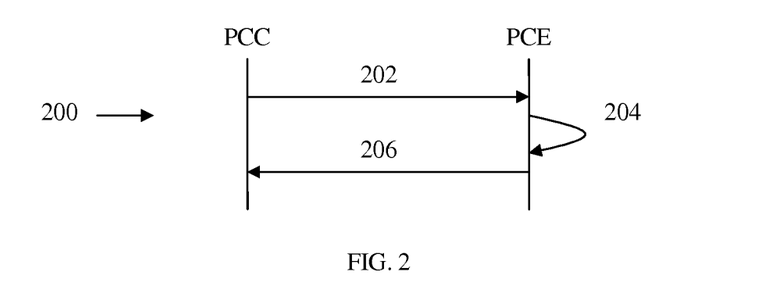
FIG. 2 is a protocol diagram of an embodiment of the communications between a path computation element (PCE) and a path computation client (PCC).

FIG. 2 illustrates an embodiment of a path computation communication method 200 between the PCC and the PCE. The method 200 may be implemented using any suitable protocol, such as the PCEP. The method 200 begins when the PCC sends a path computation request 202 to the PCE. The request 202 may comprises the OQC object described below. In some embodiments, the request 202 may comprise an indication of the need for a given source-destination (S-D) path through the network. At 204, the PCE calculates a path through the network that meets the path computation constraints and any other network constraints. The PCE then sends a path computation reply 206 to the PCC. The reply 206 may comprise one or more paths through the network, which may be embodied as the OQC object and TLVs described below. In some embodiments, the reply 206 may comprise an indication whether the requested S-D path satisfies the path computation constraints. If the PCE is not able to calculate a path through the network that satisfies the path computation constraints, then the reply 206 may contain an error message that indicates that the PCE is not able to calculate a path through the network that satisfies the path computation constraints. Alternatively, if the PCE is not allowed to calculate a path through the network, then the reply 206 may contain an error message that indicates that the PCE is not allowed to calculate a path through the network, for example, due to policy reasons.

Figure 3:
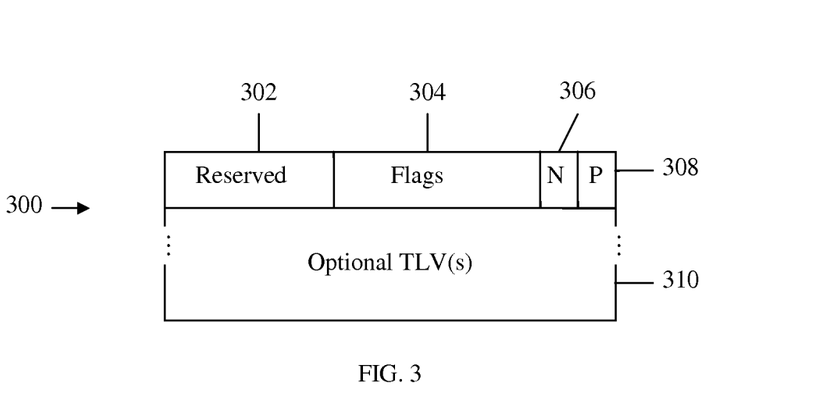
FIG. 3 is a schematic diagram of an embodiment of an optical quality constraint (OQC) object.

FIG. 3 illustrates an embodiment of the OQC object 300 that may be included in the request and reply messages described herein. The OQC object 300 may comprise a reserved field 302, a flags field 304 comprising one or more flags, such as an N flag 306 and a P flag 308, and optionally one or more TLVs 310. The reserved field 302 may comprise the first about 10 bits of the OQC object 300 and may be reserved for uses by the PCC and PCE unrelated to the path computation constraints. The flags field 304 may comprise the subsequent about 22 bits of the OQC object 300 and may comprise one or more flags. Each flag may be related to one or more path computation constraints, such as the optical quality constraints. The flags may be any length and may be positioned anywhere and in any order in the flags field 304, but in an embodiment, each flag is about one bit in length and the flags are justified to the right of the flags field 304 in a predetermined order. In such a case, the presence of a one bit in a particular location may indicate that a particular path computation constraint exists or is applicable to the path computation request or reply. Alternatively, a zero bit in a particular location may indicate that the particular path computation constraint does not exist or is not applicable to the path computation request or reply. The presence of the one bit or the zero bit in the flags field 304 may also have differing meaning depending on whether the one bit or the zero bit is part of the request or the reply. The TLVs 310 may be associated with the flags in the flags field 304, and may provide more information regarding the path computation constraints.

For example and as shown in FIG. 3, the $31^{st}$ bit in the OQC object 300 may be the N flag 306. The N flag 306 may be associated with the OSNR associated with the path. When the N flag 306 is set to zero in the request, it may indicate that the OSNR does not have to be considered in the path computation. When the N flag 306 is set to one in the request, it may indicate that the OSNR should be considered in the path computation. In such a case, the OQC object 300 may comprise a TLV 310 that contains further details regarding the OSNR, such as a value for the upper limit of the OSNR. When the N flag 306 is set to zero in the reply, it may indicate that the computed path does not comply with the OSNR constraint, further details of which may be included in a TLV 310. When the N flag 306 is set to one in the reply, it may indicate that the computed path complies with the OSNR constraint.

Similarly, the $32^{nd}$ bit in the OQC object 300 may be the P flag 308. The P flag 308 may be associated with the PMD associated with the path. When the P flag 308 is set to zero in the request, it may indicate that the PMD does not have to be considered in the path computation. When the P flag 308 is set to one in the request, it may indicate that the PMD should be considered in the path computation. In such a case, the OQC object 300 may comprise a TLV 310 that contains further details regarding the PMD, such as a value for the upper limit of the PMD. When the P flag 308 is set to zero in the reply, it may indicate that the computed path does not comply with the PMD constraint, further details of which may be included in a TLV 310. When the P flag 308 is set to one in the reply, it may indicate that the computed path complies with the PMD constraint.

Figure 4:
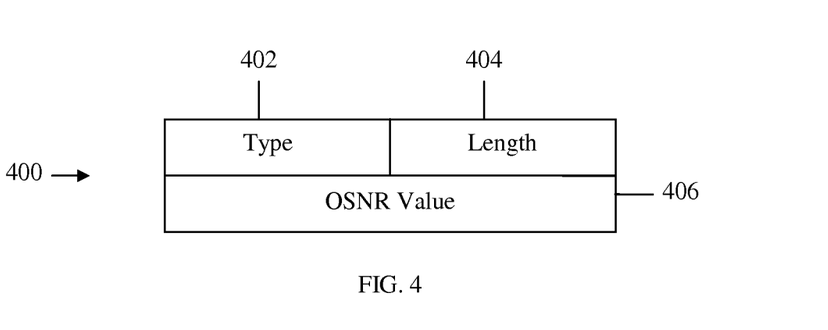
FIG. 4 is a schematic diagram of an embodiment of a type, length, and value (TLV) sub-object.

FIG. 4 illustrates one embodiment of a TLV 400 that may be associated with the N flag in the OQC object. The TLV 400 may comprise a type field 402, a length field 404, and a value field 406. The type field 402 may comprise the first about 16 bits of the TLV 400 and may associate the TLV 400 with the N flag in the OQC object. The length field 404 may be the subsequent about 16 bits and may indicate the size of the value field 406 in bytes. The value field 406 may be any size, but in some embodiments is the subsequent about 32 bits on the TLV 400. The value field 406 may contain information related to the OSNR, such as the OSNR upper limit for the path or other OSNR impairment factor details.

Figure 5:
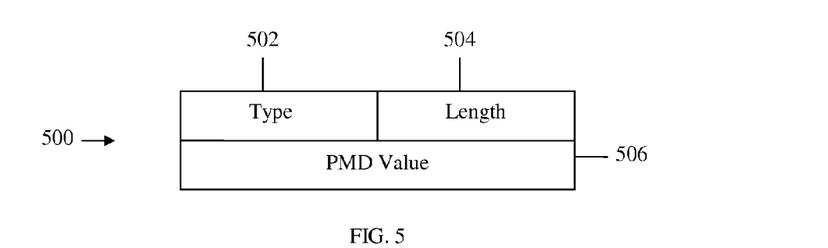
FIG. 5 is a schematic diagram of another embodiment of a TLV sub-object.

FIG. 5 illustrates one embodiment of a TLV 500 that may be associated with the P flag in the OQC object. The TLV 500 may comprise a type field 502, a length field 504, and a value field 506. The type field 502 may comprise the first about 16 bits of the TLV 500 and may associate the TLV 500 with the P flag in the OQC object. The length field 504 may be the subsequent about 16 bits and may indicate the size of the value field 506 in bytes. The value field 506 may be any size, but in some embodiments is the subsequent about 32 bits on the TLV 500. The value field 506 may contain information related to the PMD, such as the PMD upper limit for the path or other PMD impairment factor details.

Figure 6:
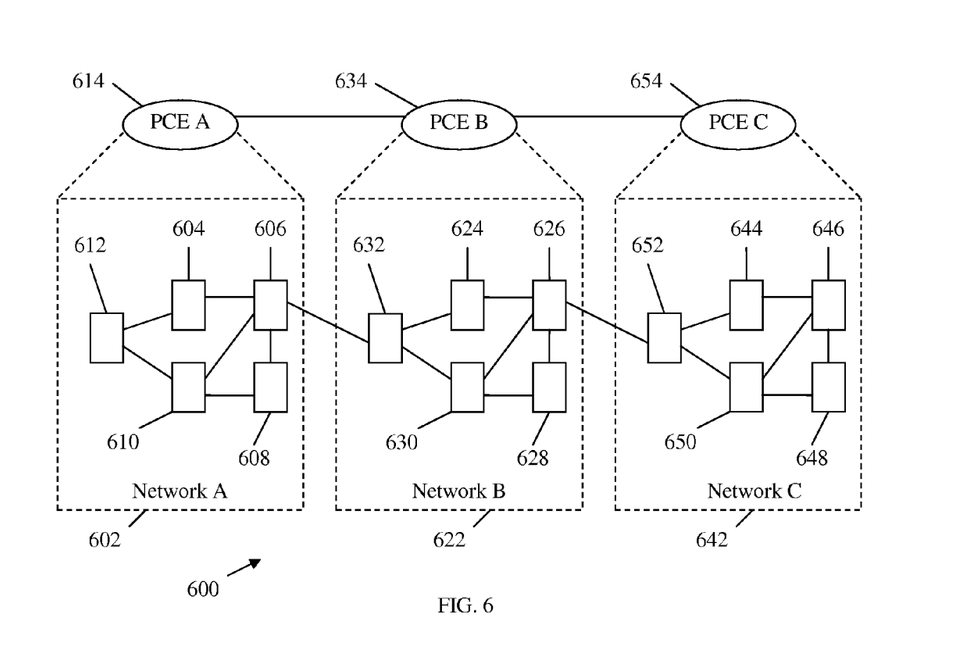
FIG. 6 is a schematic diagram of an embodiment of a multi-domain network architecture.

FIG. 6 illustrates an embodiment of a multi-domain network architecture 600 that may be used to illustrate the concepts described herein. The multi-domain network architecture 600 may comprise three networks: network A 602, network B 622, and network C 642, which may each be similar to the WSON described above. Network A 602 may comprise PCE A 614 and nodes 604, 606, 608, 610, and 612 (collectively 604-612). Similarly, Network B 622 may comprise PCE B 634 and nodes 624, 626, 628, 630, and 632 (collectively 624-632), and Network C 642 may comprise PCE C 654 and nodes 644, 646, 648, 650, and 652 (collectively 644-652). PCE A 614 can communicate with each of the nodes 604-612 and can calculate paths subject to path computation constraints within network A 602. Similarly, PCE B 634 can communicate with each of the nodes 624-632 and can calculate paths subject to path computation constraints within network B 622, and PCE C 654 can communicate with each of the nodes 644-652 and can calculate paths subject to path computation constraints within network C 642. In addition, the various components within the multi-domain network architecture 600 are coupled to and can communicate with each other as indicated by the solid lines in FIG. 6. It will be appreciated that while FIG. 6 is described in the context of a multi-domain network architecture, the concepts described herein are also applicable to situations where multiple PCEs are responsible for certain sections of a single network.

Figure 7:
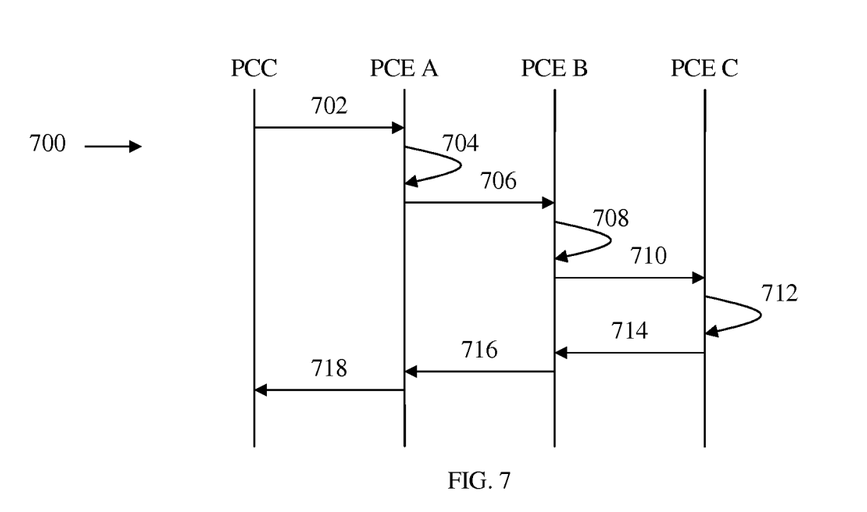
FIG. 7 is a protocol diagram of an embodiment of the communications in a multi-domain network architecture.

FIG. 7 illustrates one embodiment of a path computation communication method 700 between the PCC and the PCEs for the three networks illustrated in FIG. 6. Specifically, FIG. 7 illustrates the case where the path computation is performed by multiple PCEs, and each PCE may indicate whether the path computation constraints have been satisfied within the network or network portion of the path for which the PCE is responsible. The method 700 may be implemented using any suitable protocol, such as the PCEP. The method 700 begins when the PCC sends a path computation request 702 to one of the PCEs, such as PCE A. The request 702 may comprises the OQC object described above. In some embodiments, the request 702 may comprise an indication of the need for a path computation for a given S-D path in one or more of networks A, B, and C. At 704, PCE A calculates a path through network A that meets the path computation constraints and any other network constraints. For example, PCE A may determine that a path through nodes 612, 604, and 606 meets the path computation constraints for network A. Assuming that PCE A can calculate a path that meets the path computation constraints for network A, PCE A forwards the request 706 to PCE B. At 708, PCE B calculates a path through network B that meets the path computation constraints and any other network constraints. For example, PCE B may determine that a path through nodes 632, 630, and 626 meets the path computation constraints for network B. Assuming that PCE B can calculate a path that meets the path computation constraints for network B, PCE B forwards the request 710 to PCE C.

At 712, PCE C calculates a path through network C that meets the path computation constraints and any other network constraints. In some cases, PCE C may be able to calculate a path that meets the path computation constraints for network C. For example, PCE C may determine that a path through nodes 652, 650, 648, and 646 meets the path computation constraints for network C. In such cases, PCE C may add the path and any information related to the path to a reply 714, and sends the reply 714 to PCE B. In other cases, PCE C may not be able to calculate a path that meets the path computation constraints for network C. For example, PCE C may determine that no path through network C meets the path computation constraints for network C. In such cases, PCE C may add one of the error messages described above and an optional explanation to the reply 714, and may send the reply 714 to PCE B. In either case, the reply 714 may comprise the OQC object described above, which may include at least one path, at least one error message, and/or at least one indication whether the requested S-D path satisfies the path computation constraints. Upon receiving the reply 714, PCE B may include the path through network B and any other related information in the reply 716 sent to PCE A. Upon receiving the reply 716, PCE A may include the path through network A and any other related information in the reply 718 sent to the PCC. Thus, upon receipt of the reply 718, the PCC knows whether a path through the networks A, B, and C exists, and if not, the location of and reason for the path computation failure. It will also be appreciated that in some embodiments the various PCEs may add one or more of their paths to the request as it is propagated through the networks, rather than adding their paths to the reply as it is returned through the networks.

Figure 8:
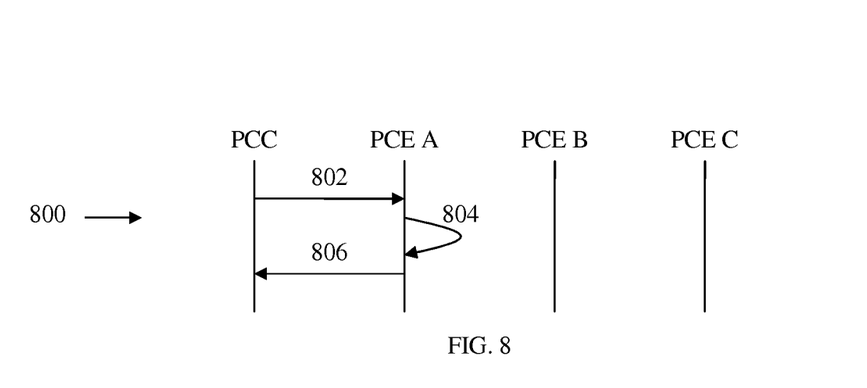
FIG. 8 is a protocol diagram of another embodiment of the communications in a multi-domain network architecture.

FIG. 8 illustrates another embodiment of a path computation communication method 800 between the PCC and the PCEs for the three networks illustrated in FIG. 6. Specifically, FIG. 8 illustrates the case where the path computation is performed by multiple PCEs, but the path computation fails at the first PCE, e.g. PCE A. The method 800 may be implemented using any suitable protocol, such as the PCEP. The method 800 begins when the PCC sends a path computation request 802 to one of the PCEs, such as PCE A. The request 802 may comprises the OQC object described above. In some embodiments, the request 802 may comprise an indication of the need for a path computation for a given S-D path in one or more of networks A, B, and C. At 804, PCE A attempts to calculate a path through network A that meets the path computation constraints and any other network constraints. In this case, PCE A may not be able to calculate a path that meets the path computation constraints for network A. For example, PCE A may determine that no path through network A meets the path computation constraints for network A. Thus, PCE A may add one of the error messages described above and an optional explanation to the reply 806, and sends the reply 806 to the PCC. Thus, the method 800 does not forward requests through the various networks when no path meeting the path computation constraints can be found in the first network. It will also be appreciated that the communications between the PCC and the PCEs may be any combination of methods 700 and 800 and/or modified by some policy, for example where the request is forwarded to the next PCE unless more than one of the path computation constraints cannot be met.

Figure 9:
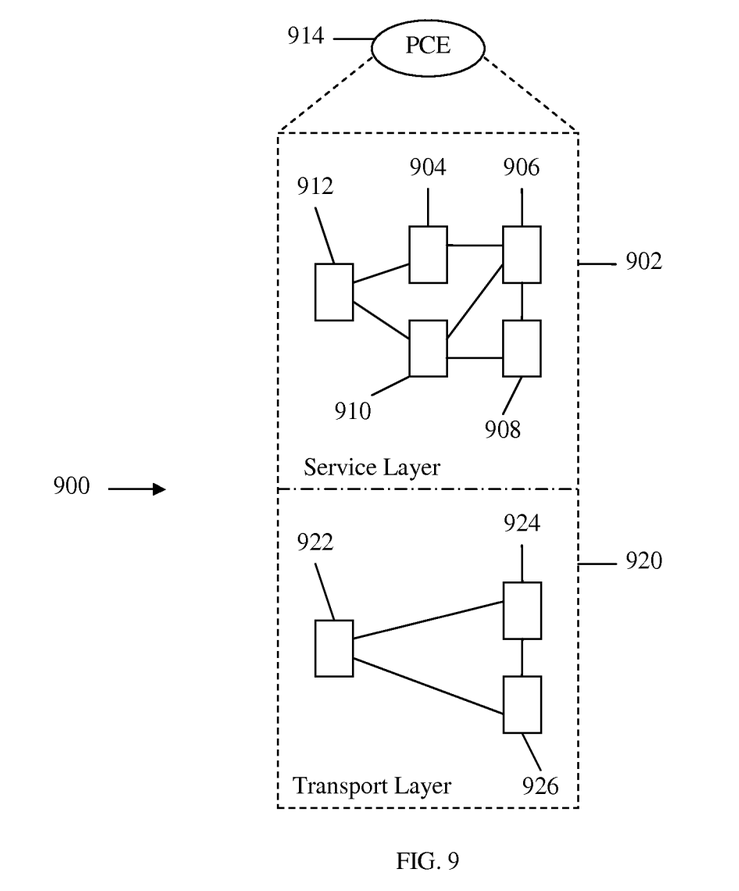
FIG. 9 is a schematic diagram of an embodiment of a multi-layer network architecture.

FIG. 9 illustrates an embodiment of a multi-layer network architecture 900 that may be used to illustrate the concepts described herein. The multi-layer network architecture 900 may be similar to the WSON described above and may comprise a PCE 914 and two layers: a service layer 902 and a transport layer 920. The service layer 902 may comprise nodes 904, 906, 908, 910, and 912 (collectively 904-912), and the transport layer 920 may comprise nodes 922, 924, and 926 (collectively 922-926). In some embodiments, at least some of the nodes 904-912 may be the same physical structure as at least some of the nodes 922-926, but wherein the nodes 904-912 are separated from the nodes 922-926 by one or more logical partitions. The PCE 914 can communicate with each of the nodes 904-912 and 922-926 and can calculate paths subject to path computation constraints within the service layer 902 and the transport layer 920. In addition, the various components within the multi-layer network architecture 900 have the topologies as shown in that they are coupled to and can communicate with each other as indicated by the solid lines in FIG. 9. It will be appreciated that while FIG. 9 is described in the context of a single multi-layer network architecture, the concepts described herein are also applicable to situations where one or more PCEs are responsible for a plurality of path computations in a plurality of multi-layer networks.

Figure 10:
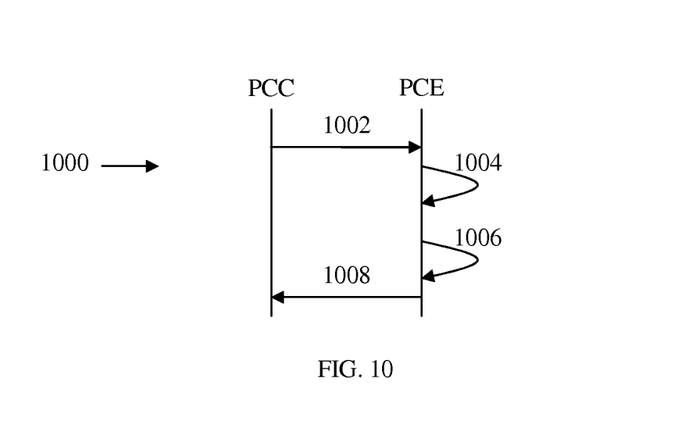
FIG. 10 is a protocol diagram of an embodiment of the communications in a multi-layer network architecture.

FIG. 10 illustrates an embodiment of a path computation communication method 1000 between the PCC and the PCE for the network illustrated in FIG. 9. Specifically, FIG. 10 illustrates the case where the path computation for multiple layers within a single network is performed by a single PCE. The method 1000 may be implemented using any suitable protocol, such as the PCEP. The method 1000 begins when the PCC sends a path computation request 1002 to the PCE. The request 1002 may comprises the OQC object described above. In some embodiments, the request 1002 may comprise an indication of the need for a path computation for a given S-D path in the service layer, the transport layer, or both. At 1004, the PCE calculates a path through the service layer that meets the path computation constraints and any other network constraints. For example, the PCE may determine that a path through nodes 912, 904, and 906 meets the path computation constraints for the service layer. Assuming that the PCE can calculate a path that meets the path computation constraints for the service layer, the PCE verifies whether the path selected at 1004 meets the path computation constraints and any other network constraints of the transport layer at 1006. In some cases, the path selected at 1004 meets the path computation constraints and any other network constraints for the transport layer. For example, the PCE may determine that a path through nodes 922 and 924 meets the path computation constraints for the transport layer. In such cases, the PCE adds the path and any information related to the path to a reply 1008, and sends the reply 1008 to the PCC.

In other cases, the path selected at 1004 may not meet one or more of the path computation constraints and any other network constraints for the transport layer. For example, the PCE may determine that a path through nodes 922 and 924 does not meet the path computation constraints for transport layer. In such cases, the PCE will analyze alternative and perhaps less optimal paths through the service layer and the transport layer to determine if there are any paths that satisfy the path computation constraints for both the service layer and the transport layer. For example, the path through nodes 912, 910, and 908 may satisfy the service layer path computation constraints while also satisfying the transport layer path computation constraints for the transport layer nodes 922, 926, and 924. If such a path is found, the PCE may include the path and any other related information in the reply 1008 sent to the PCC. If such a path is not found, the PCE may include one of the error messages described above and an optional explanation in the reply 1008 sent to the PCC. In any event, the reply 1008 may comprise the OQC object described above, which may comprise at least one path, at least one error message, and/or at least one indication whether the requested S-D path satisfies the path computation constraints. Thus, upon receipt of the reply 1008, the PCC knows whether a path through the service layer and transport layer exists, and if not, the location of and reason for the path computation failure.

Figure 11:
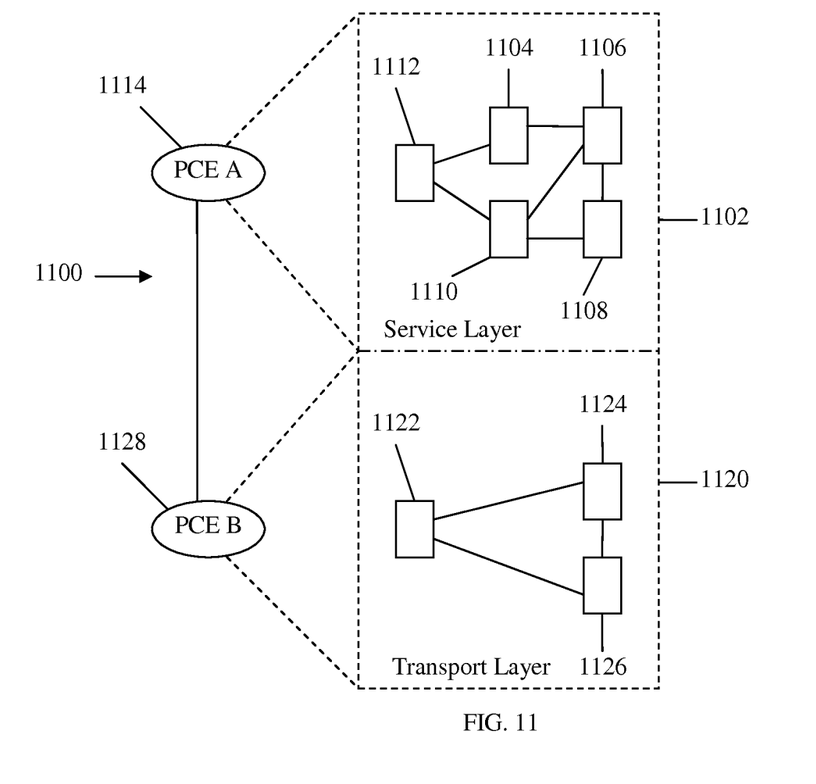
FIG. 11 is a schematic diagram of another embodiment of a multi-layer network architecture.

FIG. 11 illustrates an embodiment of a multi-layer network architecture 1100 that may be used to illustrate the concepts described herein. The multi-layer network architecture 1100 may be similar to the WSON described above, and may comprises two PCEs, PCE A 1114 and PCE B 1128, and two layers, a service layer 1102 and a transport layer 1120. The service layer 1102 may comprise nodes 1104, 1106, 1108, 1110, and 1112 (collectively 1104-1112), and transport layer 1120 may comprise nodes 1122, 1124, and 1126 (collectively 1122-1126). In some embodiments, at least some of the nodes 1104-1112 may be the same physical structure as at least some of the nodes 1122-1126, but wherein the nodes 1104-1112 are separated from the nodes 1122-1126 by one or more logical partitions. PCE A 1114 can communicate with each of the nodes 1104-1112 and can calculate paths subject to path computation constraints within the service layer 1102, while PCE B 1128 can communicate with each of the nodes 1122-1126 and can calculate paths subject to path computation constraints within transport layer 1120. In addition, the various components within the multi-layer network architecture 1100 have the topologies as shown in that they are coupled to and can communicate with each other as indicated by the solid lines in FIG. 11. It will be appreciated that while FIG. 11 is described in the context of a single multi-layer network architecture, the concepts described herein are also applicable to situations where a single PCE is responsible for one or more layers in multiple networks.

Figure 12:
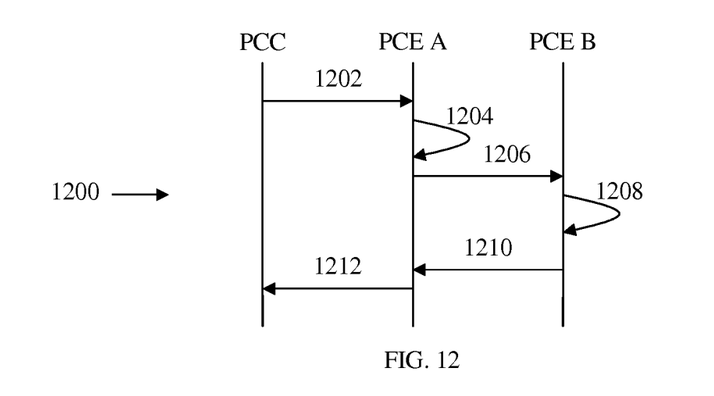
FIG. 12 is a protocol diagram of another embodiment of the communications in a multi-layer network architecture.

FIG. 12 illustrates another embodiment of a path computation communication method 1200 between the PCC and the two PCEs for the network illustrated in FIG. 11. Specifically, FIG. 12 illustrates the case where the path computation for each layer is performed by a separate PCE. The method 1200 may be implemented using any suitable protocol, such as the PCEP. The method 1200 begins when the PCC sends a path computation request 1202 to PCE A. The request 1202 may comprise the OQC object described above. In some embodiments, the request 1202 may comprise an indication of the need for a path computation for a given S-D path in the service layer, the transport layer, or both. At 1204, PCE A calculates a path through the service layer that meets the path computation constraints and any other network constraints. For example, PCE A may determine that a path through nodes 1112, 1104, and 1106 meets the path computation constraints for the service layer. If there is not a path through the service layer that meets the path computation constraints and any other network constraints, then the PCE A can send a reply message to the PCC with one of the error messages described above. Assuming that PCE A can calculate a path that meets the path computation constraints and any other network constraints, PCE A includes the path in the request 1206 sent to PCE B. Upon receipt of the request 1206, PCE B verifies whether the path selected at 1204 meets the path computation constraints and any other network constraints for the transport layer at 1208. In some cases, the path selected at 1204 meets the path computation constraints and any other network constraints for the transport layer. For example, PCE B may determine that a path through nodes 1122 and 1124 meets the path computation constraints for transport layer. In such cases, PCE B includes the path and any other related information in the reply 1210 sent to PCE A. PCE A then forwards the reply 1212 back to the PCC.

In other cases, the path selected at 1204 may not meet one or more of the path computation constraints and any other network constraints for the transport layer. For example, PCE B may determine that the path through nodes 1122 and 1124 does not meet the path computation constraints for transport layer. In such cases, PCE B will analyze alternative and perhaps less optimal paths through the transport layer to determine if there are any paths that satisfy the path computation constraints for the transport layer. For example, the path through nodes 1122, 1126, and 1124 may satisfy the transport layer path computation constraints. If such a path is not found, PCE B may include one of the error messages described above and an optional explanation in the reply 1210 sent to PCE A. If such a path is found, PCE B may include the path and any related information in the reply 1210 sent to PCE A. Upon receipt of a reply 1210 with an alternate path, PCE A verifies whether the alternate path selected at 1208 meets the path computation constraints and any other network constraints for the service layer. If the alternate path selected at 1208 meets the path computation constraints and any other network constraints for the service layer, PCE A may adopt the alternate path as the service layer path, and may include the alternate path in the reply 1212 sent to the PCC. If the path selected at 1208 does not meet the path computation constraints and any other network constraints of the service layer, then PCEs A and B can repeat the steps 1204, 1206, 1208, and 1210 until either a path satisfying the path computation constraints for both the service layer and the transport layer is found, or it is determined that there is not a path that satisfies the path computation constraints for both the service layer and the transport layer. After such, the path or an error message is included in the reply 1212 sent to the PCC. In some embodiments, PCE A may add a plurality of paths to the request 1206 so that PCE B can verify each of the paths and indicate such in the reply 1210. If there are multiple valid paths, PCE A can choose to keep one or more of these paths in the reply 1210, and forward the reply 1212 to the PCC. In any event, the reply 1212 may comprise the OQC object described above, which may comprise at least one path, at least one error message, and/or at least one indication whether the requested S-D path satisfies the path computation constraints. Thus, upon receipt of the reply 1212, the PCC knows whether a path through the service layer and transport layer exists, and if not, the location of and reason for the path computation failure.

Figure 13:
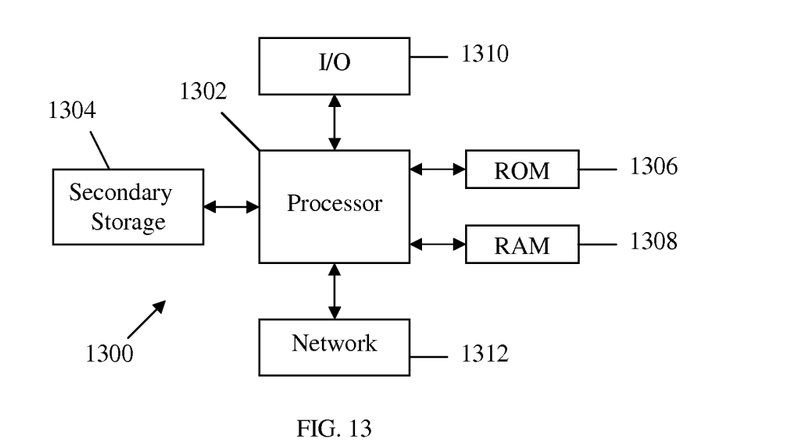
FIG. 13 is a schematic diagram of one embodiment of a general-purpose computer system.

The network components described above may be implemented on any general-purpose network component, such as a computer or network component with sufficient processing power, memory resources, and network throughput capability to handle the necessary workload placed upon it. FIG. 13 illustrates a typical, general-purpose network component suitable for implementing one or more embodiments of the components disclosed herein. The network component 1300 includes a processor 1302 (which may be referred to as a central processor unit or CPU) that is in communication with memory devices including secondary storage 1304, read only memory (ROM) 1306, random access memory (RAM) 1308, input/output (I/O) devices 1310, and network connectivity devices 1312. The processor may be implemented as one or more CPU chips, or may be part of one or more application specific integrated circuits (ASICs).

The secondary storage 1304 is typically comprised of one or more disk drives or tape drives and is used for non-volatile storage of data and as an over-flow data storage device if RAM 1308 is not large enough to hold all working data. Secondary storage 1304 may be used to store programs that are loaded into RAM 1308 when such programs are selected for execution. The ROM 1306 is used to store instructions and perhaps data that are read during program execution. ROM 1306 is a non-volatile memory device that typically has a small memory capacity relative to the larger memory capacity of secondary storage 1304. The RAM 1308 is used to store volatile data and perhaps to store instructions. Access to both ROM 1306 and RAM 1308 is typically faster than to secondary storage 1304.

Figure 14:
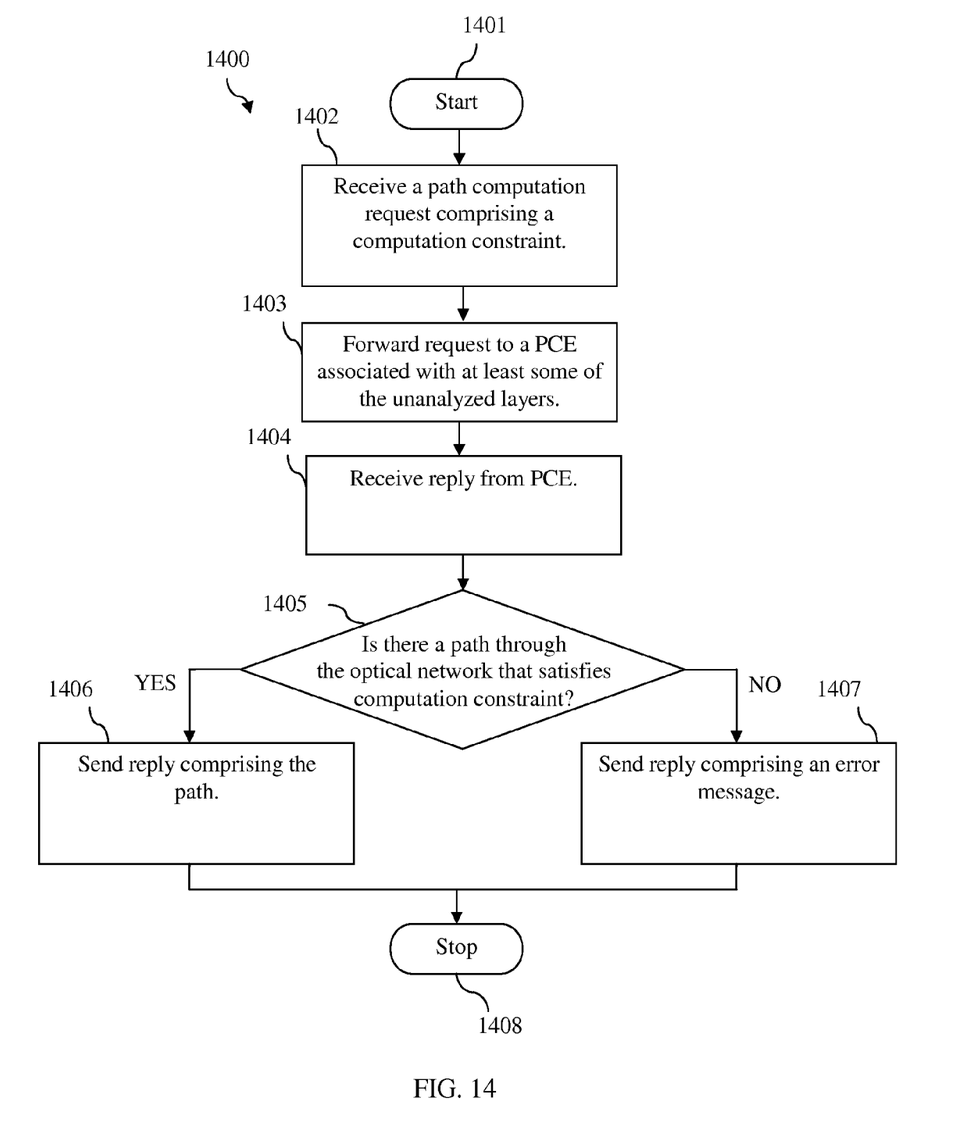
FIG. 14 is a flowchart of an embodiment of a method.

FIG. 14 is a flowchart that illustrates an embodiment of method 1400 which may be implemented by the processor of a PCC. The method 1400 starts at 1401 when a path computation request comprising a computation constraint is received at 1402. Upon receiving the request, the request is forwarded to a PCE associated with at least some of the unanalyzed network layers at 1403. Once a reply is received from the PCE at 1404, a determination is made as to whether there is a path through the optical network that satisfies the path computation constraints at 1405. If there is at least one path through the optical network that satisfies the path computation constraints, a reply that comprises the path is sent to the source of the initial request at 1406. If there is not a path through the optical network that satisfies the path computation constraints, a reply that comprises an error message is sent to the source of the initial request at 1407. The method stops at 1408.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method implemented in a first Path Computation Element (PCE) operating in a first Wavelength Switched Optical Network (WSON) layer, wherein the method comprises:
receiving a path computation request from a second PCE operating in a second WSON layer associated with services, wherein the path computation request comprises:
a logical service path across the second WSON layer; and
a plurality of first flags that indicate whether one or more first WSON layer optical quality constraints are applicable to the path computation request;
verifying the logical service path of the second WSON layer according to the first WSON layer optical quality constraints by:
computing a lightpath for the logical service path across the first WSON layer for transporting optical signals;
receiving one or more optical impairment characteristics from nodes along the lightpath via signaling;
performing an optical impairment computation of the lightpath by employing at least one of the optical impairment characteristics that corresponds to the first WSON layer optical quality constraints from the path computation request; and
making a decision on an optical impairment validity of the lightpath based on the optical impairment computation resulting in an impairment validated lightpath; and
transmitting a path computation reply to the second PCE, wherein the path computation reply comprises:
the impairment validated lightpath as part of an impairment validated routing and wavelength assignment (RWA) across a plurality of WSON layers in a single network domain; and
a plurality of second flags that indicate impairment validity statuses of the impairment validated lightpath corresponding to the first WSON layer optical quality constraints from the path computation request.

2. The method of claim 1, wherein the optical impairment characteristics are selected from a group of Optical Signal to Noise Ratio (OSNR) and dispersion.

3. The method of claim 1, wherein the optical impairment characteristics are not distributed between the WSON layers.

4. The method of claim 1, wherein the path computation request is received from the second PCE using PCE Protocol (PCEP).

5. The method of claim 1, wherein the path computation reply is transmitted to the second PCE using PCE Protocol (PCEP).

6. The method of claim 1, wherein the second WSON layer is a service layer, and wherein the first WSON layer is a transport layer.

7. An apparatus configured to implement a first Path Computation Element (PCE) operating in a first Wavelength Switched Optical Network (WSON) layer comprising:
at least one processor configured to:
receive a first path computation request from a Path Computation Client (PCC);
compute a logical service path across the first WSON layer according to the first path computation request;
receive one or more impairment characteristics from a node along the logical service path via signaling;
perform an impairment computation on the logical service path by employing at least one of the impairment characteristics;
make a decision on an impairment validity of the logical service path based on at least one impairment characteristic;
transmit a second path computation request to a second PCE operating in a second WSON layer that transports optical signals, wherein the second path computation request comprises:
a lightpath impairment validation request for the computed logical service path; and
a plurality of first flags that indicate whether one or more optical quality constraints are applicable to the second path computation request;

receive a first path computation reply from the second PCE, wherein the first path computation reply comprises:
  an optical impairment validated lightpath associated with the logical service path; and
  a plurality of second flags that indicate impairment validity statuses of the optical impairment validated lightpath across the second WSON layer corresponding to the optical quality constraints from the second path computation request; and
transmit a second path computation reply to the PCC comprising the optical impairment validated lightpath as part of an impairment validated routing and wavelength assignment (RWA) across a plurality of WSON layers in a single network domain.

8. The apparatus of claim 7, wherein the optical quality constraints are selected from a group of Optical Signal to Noise Ratio (OSNR) and dispersion.

9. The apparatus of claim 7, wherein the processor is further configured to receive a path computation constraint from the PCC, and wherein the impairment validity of the logical service path is further based on the path computation constraint.

10. The apparatus of claim 7, wherein the impairment characteristics are not distributed between the WSON layers.

11. The apparatus of claim 7, wherein the first path computation reply is received from the second PCE using PCE Protocol (PCEP).

12. The apparatus of claim 7, wherein the second path computation request is transmitted to the second PCE using PCE Protocol (PCEP).

13. The apparatus of claim 7, wherein the second path computation reply is transmitted to the PCC using PCE Protocol (PCEP).

14. The apparatus of claim 7, wherein the first WSON layer is a service layer, and wherein the second WSON layer is a transport layer.

15. The apparatus of claim 7, wherein the processor is further configured to receive the first flags from the PCC.

16. The apparatus of claim 7, wherein the first path computation request is received from the PCC using PCE protocol (PCEP).

* * * * *